(12) United States Patent
Ahmad et al.

(10) Patent No.: US 10,037,301 B2
(45) Date of Patent: Jul. 31, 2018

(54) CIRCUITS AND METHODS FOR INTER-PROCESSOR COMMUNICATION

(71) Applicant: Xilinx, Inc., San Jose, CA (US)

(72) Inventors: Sagheer Ahmad, Cupertino, CA (US); Soren Brinkmann, Santa Cruz, CA (US)

(73) Assignee: XILINX, INC., San Jose, CA (US)

( * ) Notice: Subject to any disclaimer, the term of this patent is extended or adjusted under 35 U.S.C. 154(b) by 529 days.

(21) Appl. No.: 14/638,692

(22) Filed: Mar. 4, 2015

(65) Prior Publication Data

US 2016/0259756 A1 Sep. 8, 2016

(51) Int. Cl.
| | |
|---|---|
| *G06F 15/17* | (2006.01) |
| *G06F 15/167* | (2006.01) |
| *G06F 12/14* | (2006.01) |
| *G06F 13/24* | (2006.01) |
| *G06F 13/42* | (2006.01) |
| *G06F 13/16* | (2006.01) |
| *G06F 15/173* | (2006.01) |

(52) U.S. Cl.
CPC ........ *G06F 15/167* (2013.01); *G06F 12/1425* (2013.01); *G06F 13/1673* (2013.01); *G06F 13/24* (2013.01); *G06F 13/4221* (2013.01); *G06F 15/17* (2013.01); *G06F 15/17337* (2013.01); *G06F 2212/1052* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | | |
|---|---|---|---|
| 5,801,547 A | 9/1998 | Kean | |
| 7,450,857 B2 * | 11/2008 | Dress | ...................... G06E 3/006 398/164 |
| 7,970,279 B2 * | 6/2011 | Dress | ...................... G06E 3/006 398/168 |
| 8,356,125 B1 | 1/2013 | Secatch | |
| 8,468,510 B1 | 6/2013 | Sundararajan et al. | |

(Continued)

OTHER PUBLICATIONS

Specification and drawings for U.S. Appl. No. 14/464,654, filed Aug. 20, 2014, Ansari et al.

*Primary Examiner* — Henry Tsai
*Assistant Examiner* — Christopher Bartels
(74) *Attorney, Agent, or Firm* — LeRoy D. Maunu

(57) ABSTRACT

Various example implementations are directed to circuits and methods for communicating between disparate processor circuits. According to an example implementation, a circuit arrangement includes a plurality of processor circuits and an inter-processor communication circuit. The inter-processor communication circuit is configured to provide, for each pair of the processor circuits, a respective communication channel between the pair of processor circuits. The inter-processor communication circuit includes a plurality of buffers including a respective first buffer and a respective second buffer for each communication channel. An access control circuit included in the inter-processor communication circuit is configured to restrict write access to the respective first buffer to the first processor circuit and restrict write access to the respective second buffer to the second processor circuit.

20 Claims, 8 Drawing Sheets

(56) References Cited

U.S. PATENT DOCUMENTS

| | | | |
|---|---|---|---|
| 8,473,904 B1 | 6/2013 | Sundararajan et al. | |
| 9,378,003 B1 | 6/2016 | Sundararajan et al. | |
| 2004/0210695 A1* | 10/2004 | Weber | G06F 9/526 710/240 |
| 2005/0041970 A1* | 2/2005 | Harai | H04Q 11/0005 398/51 |
| 2006/0018332 A1* | 1/2006 | Kakani | H04L 1/1614 370/428 |
| 2006/0064508 A1* | 3/2006 | Panwar | H04L 49/90 709/250 |
| 2006/0294112 A1* | 12/2006 | Mandato | H04L 29/06027 |
| 2007/0008902 A1* | 1/2007 | Yaramada | H04L 12/5695 370/252 |
| 2007/0180295 A1* | 8/2007 | Byrne | G06F 11/1076 714/6.12 |
| 2008/0155571 A1* | 6/2008 | Kenan | G06F 9/542 719/326 |
| 2008/0235415 A1* | 9/2008 | Clark | G06F 17/5031 710/105 |
| 2008/0256271 A1* | 10/2008 | Breed | G06F 12/06 710/52 |
| 2008/0316921 A1* | 12/2008 | Mathews | H04L 47/10 370/230 |
| 2008/0320254 A1* | 12/2008 | Wingard | G06F 12/0607 711/157 |
| 2009/0228535 A1* | 9/2009 | Rathi | G06F 3/048 |
| 2012/0210095 A1* | 8/2012 | Nellans | G06F 12/1072 711/206 |
| 2012/0297043 A1* | 11/2012 | Davis | H04L 45/60 709/223 |
| 2014/0149715 A1* | 5/2014 | Inman | G06F 15/17393 712/29 |
| 2014/0281057 A1* | 9/2014 | Cohen | G06F 3/061 710/52 |
| 2017/0111146 A1* | 4/2017 | Oizumi | H04L 1/1861 |

\* cited by examiner

BACKGROUND
CIRCUITS AND METHODS FOR INTER-PROCESSOR COMMUNICATION

TECHNICAL FIELD

The disclosure generally relates to inter-processor communication.

BACKGROUND

Programmable integrated circuits (ICs) are devices that can be programmed to perform specified logic functions. One type of programmable IC, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include one or more embedded processors that are capable of executing program code. A processor can be fabricated as part of the same die that includes the programmable logic circuitry and the programmable interconnect circuitry, also referred to collectively as the "programmable circuitry" of the IC. It should be appreciated that execution of program code within a processor is distinguishable from "programming" or "configuring" the programmable circuitry that may be available on an IC. The act of programming or configuring the programmable circuitry of an IC results in the implementation of different physical circuitry as specified by the configuration data within the programmable circuitry.

SUMMARY

Various example implementations are directed to circuits and methods for communicating between processor circuits. According to an example implementation, a circuit arrangement includes a plurality of processor circuits and an inter-processor communication circuit. The inter-processor communication circuit is configured to provide, for each pair of the processor circuits, a respective communication channel between the pair of processor circuits. The inter-processor communication circuit includes a plurality of buffers including a respective first buffer and a respective second buffer for each communication channel. An access control circuit included in the inter-processor communication circuit is configured to restrict write access to the respective first buffer to the first processor circuit and restrict write access to the respective second buffer to the second processor circuit.

A method is also disclosed for communication between a plurality of processor circuits. For at least one pair of the plurality of processor circuits, write access is restricted to a respective first buffer for the pair to a first processor circuit of the pair. Write access to a respective second buffer for the pair is restricted to a second processor circuit of the pair. Messages are communicated from the first processor circuit of the pair to the second processor circuit of the pair via the respective first buffer. Messages are communicated from the second processor circuit of the pair to the first processor circuit of the pair via the respective second buffer.

BRIEF DESCRIPTION OF THE DRAWINGS

Various aspects and features of the disclosed apparatus and methods will become apparent upon review of the following detailed description and upon reference to the drawings in which.

DETAILED DESCRIPTION

Figure 1:
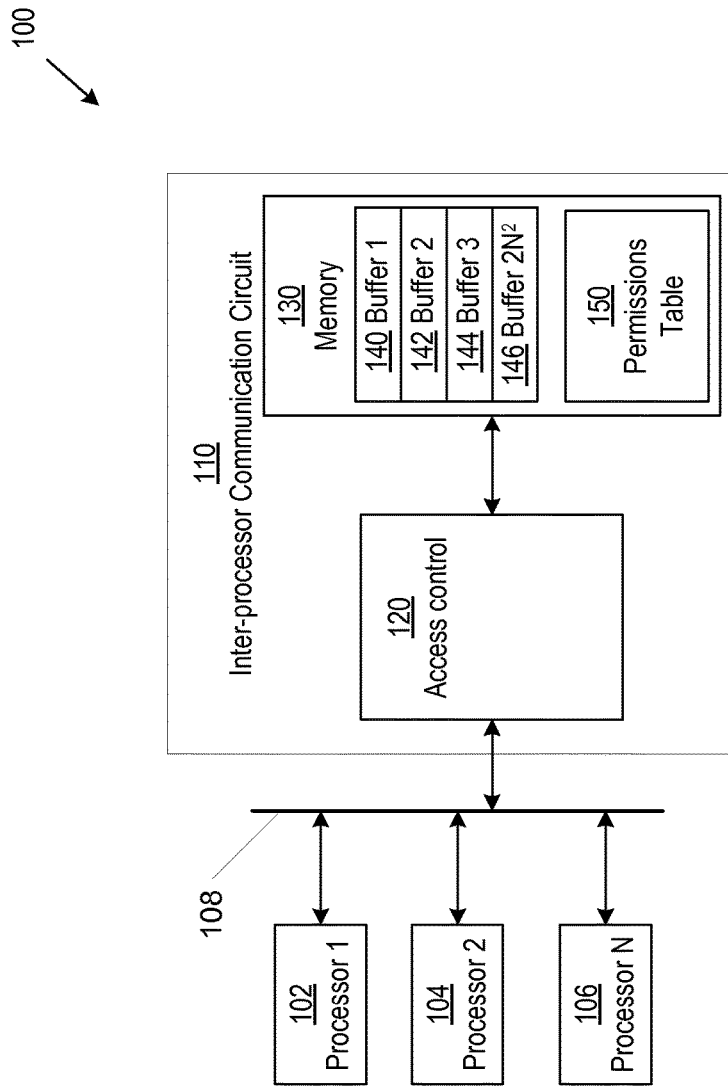
FIG. 1 shows a block level diagram of a multi-processor system.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein.

In systems having multiple processor circuits, the processor circuits may require a mechanism to communicate with each other. One approach for communication between processor circuits uses a shared block of memory accessible by all of the processor circuits. To transfer data from a first processor to a second processor, the first processor writes the data to the shared block of memory. The second processor then reads the data from the shared block of memory to complete the transfer of data. However, with multiple processors writing to the shared block of memory, conflicts may occur. For example, a message written to the shared memory by one processor may be overwritten by another processor before the message can be read by the intended recipient.

Typically, access control software is used to coordinate access to the shared memory to prevent address conflicts and/or race conditions from occurring. In multi-processor systems having identical processor circuits, access control software of one processor may be used to coordinate access by all of the identical processors to the shared memory. For an illustrative example, access control software, such as a hypervisor, may be available for coordinating memory access for different processing threads or operating systems running concurrently on the multi-processor system. When multiple identical processors are used, the access control is compatible with each of the processors and may be used to coordinate access to a block of shared memory for all of the identical processors. This approach avoids the need to develop custom access control software.

Multiprocessor systems including heterogeneous processor circuits, however, may not be able to coordinate access using existing access control software. Heterogeneous processor circuits have different circuit arrangements and/or architectures. In a system having heterogeneous processor circuits, existing access control software may not be compatible with all of the processor circuits. Example circuits and methods presented in the present disclosure provide techniques and apparatus for communicating between heterogeneous processor circuits.

Various example implementations are disclosed and are directed to circuits and methods for communicating between disparate processor circuits. According to one implementation, a circuit arrangement includes a plurality of processor circuits and an inter-processor communication circuit. The inter-processor communication circuit is configured to provide, for each pair of the processor circuits, a respective communication channel between the pair of processor circuits. The inter-processor communication circuit includes a plurality of buffers including a respective first buffer and a respective second buffer for each communication channel. An access control circuit included in the inter-processor communication circuit is configured to restrict write access to the respective first buffer to the first processor circuit and restrict write access to the respective second buffer to the second processor circuit. In some implementations, the access control circuit may also restrict read access to the first buffer to the first and second processor circuits and restrict read access to the second buffer to the first and second processor circuits. Use of dedicated buffers for communication between the processor circuits with access restrictions enforced by the access control circuit preserves data integrity in the system without requiring a complicated software-based access control mechanism to coordinate communication of messages.

In some implementations, the buffers may be implemented by respective memory addresses in a memory that is part of the inter-processor communication circuit. Alternately or additionally, one or more buffers may be implemented by a separate memory communicatively coupled to the inter-processor communication circuit. For example, the buffers may be implemented in a reserved block of main memory, used to store program code that is executed by one or more processor circuits.

The access control circuit may use various processes and/or circuit arrangements to restrict access for each buffer to the appropriate pair of processor circuits. In some implementations, all read/write transaction requests for reading from/writing to the buffers are provided to the access control circuit and examined to determine whether access to the corresponding buffer should be allowed. For example, in response to receiving a read/write transaction, the access control circuit determines permissions for the corresponding buffer from a permissions table. The permissions table may be stored, for example in a memory of the access control circuit, or in a portion of the memory used to implement the buffers. If the determined permissions indicate that the read/write transaction should be allowed, the read/write transaction request is forwarded to the memory. Otherwise, the control circuit prevents the read/write transaction, for example, by discarding the read/write transaction.

A communication channel provided by the inter-processor communication circuit may be used to communicate various messages between a pair of processor circuits. For ease of reference, the circuits are primarily described with reference to communication of request messages and response messages between a first processor circuit and a second processor circuit. Request messages may include, for example, read or write requests. Response messages may include, for example, read data or write acknowledgements. For ease of reference, the term message may be used herein to refer to either a request message or a response message. The communication channel between the first and second processor circuits may be implemented to be unidirectional or bidirectional. For example, in one bi-directional implementation, a single communication channel may be used to communicate request messages from the first processor circuit to the second processor circuit and also communicate request messages from the second processor circuit to the first processor circuit. In this context, the first buffer for the channel may be used to communicate both request and response messages from the first processor circuit to the second processor circuit. Conversely, the second buffer for the channel may be used to communicate request and response messages from the second processor circuit to the first processor circuit.

As an example unidirectional implementation, a first communication channel is used to communicate request messages from the first processor circuit to the second processor circuit, and a second communication channel is used to communicate request messages from the second processor circuit to the first processor circuit.

Different implementations may use various mechanisms to prompt the desired processor circuit to read a request message after it is written to the appropriate buffer for the processor circuit. In some implementations, a first processor circuit of a pair is configured to provide an alert to the second processor circuit of the pair after writing a message to a first buffer of the communication channel. The alert may be provided to the second processor circuit for example by setting an interrupt for the second processor. Similarly, various mechanisms may be used to prompt a processor circuit to read a response message from the second buffer of the communication channel. In one implementation, the second processor circuit may prompt the first processor circuit to read a response message from the second buffer by setting a second interrupt for the first processor circuit. In another implementation, the second processor circuit may prompt the first processor circuit to read a response message from the second buffer by clearing the first interrupt that was set by the first processor circuit.

For ease of explanation, the examples may be primarily described with reference to alerts being provided by the processor circuits after writing messages to the buffers. However, in some implementations such alerts may be provided by other circuits. For example, in one implementation, the access control circuit is configured to monitor writes to the buffers and to provide an alert to the appropriate processor after a message has been written to one of the buffers.

Turning now to the figures, FIG. 1 shows a block level diagram of a multi-processor system. The system 100 includes a plurality of processor circuits 102, 104, and 106 and an inter-processor communication circuit 110. In this example, the inter-processor communication circuit 110 is communicatively connected to the processor circuits 102, 104, and 106 via a data bus 108. The inter-processor communication circuit 110 is configured to provide a communication channel for communicating between processor circuits 102, 104, and 106. The inter-processor communication circuit includes a plurality of buffers 140, 142, 144, and 146. In this example, the buffers 140, 142, 144, and 146 are implemented by respective memory locations in a memory 130 of the inter-processor communication circuit 110. Each communication channel between a respective pair of the processor circuits 102, 104, and 106 includes a respective pair of the buffers 140, 142, 144, and 146. Each processor circuit in a pair of processor circuits is configured to communicate with the other processor circuit by writing and reading messages to/from the respective pair of buffers for the channel.

As previously described, the access control circuit 120 restricts access to each one of the buffers 140, 142, 144, and 146 in order to prevent a buffered message from being overwritten before they are read by the destination processor circuit. More specifically, for a communication channel between first and second processor circuits, the access control circuit 120 is configured to restrict write access to the first buffer for the channel to the first processor circuit. Conversely, access control circuit 120 is configured to restrict write access to the second buffer for the channel to the second processor circuit. In some implementations, the access control circuit is also configured to restrict read access to the respective first and second buffers to the respective first and second processor circuits. In other words, the access control circuit blocks processors other than the first and second processor circuits from reading from the channel dedicated for communication between the first and second processor circuits. In some implementations, the access control circuit 120 is configured to restrict read/write access to the buffers based on access permissions for each buffer indicated in a permissions table 150. The access permissions for each buffer may specify, for example, a respective processing circuit that is allowed to write data to the buffer. In some implementations, the access permissions may also specify processing circuits that are allowed to read data from the buffer. In this example, the permissions table 150 is stored in the memory 130, which is also used to implement the buffers 140, 142, 144, and 146. In some implementations, permissions table 150 may be stored in a separate memory from the buffers such as, for example, forming part of the access control circuit 120 or communicatively coupled to the inter-processor communication circuit.

Figure 2:
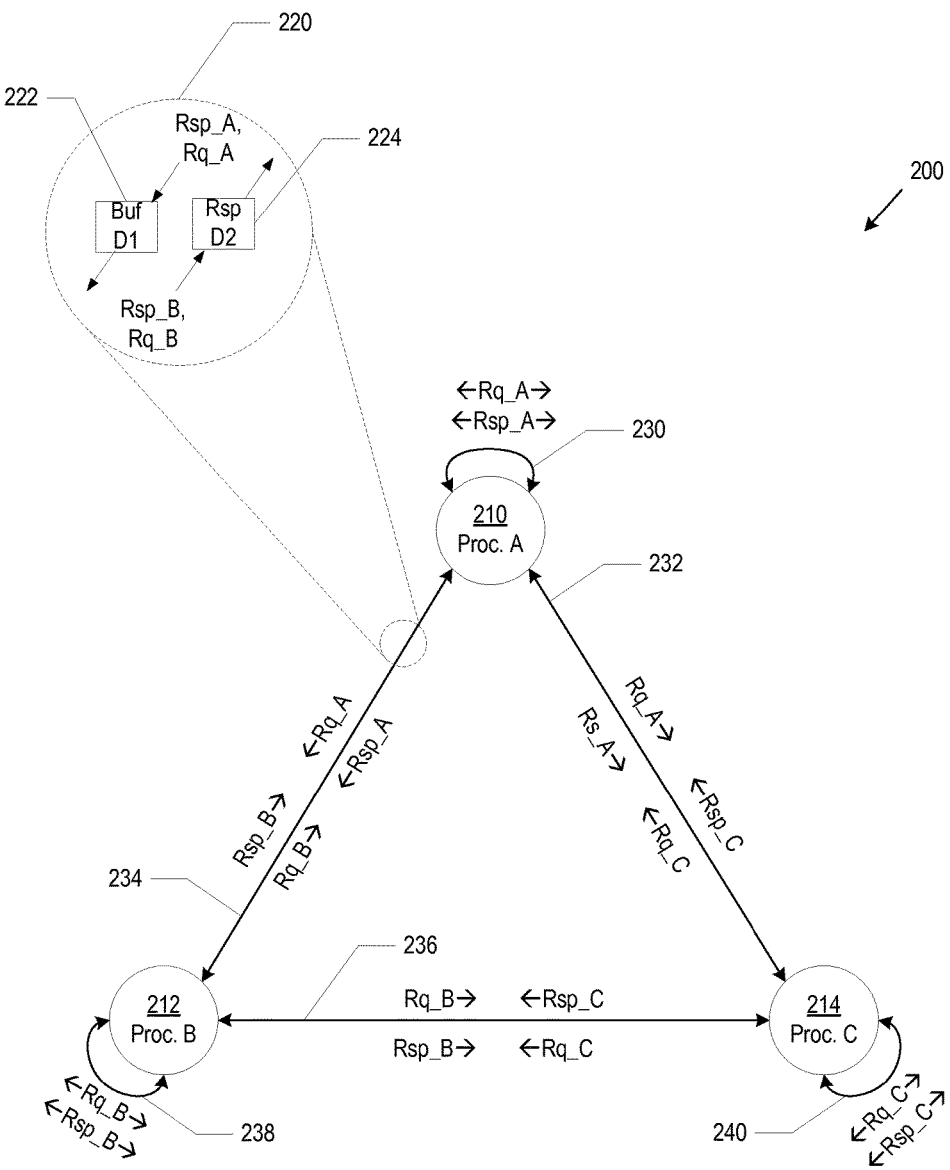
FIG. 2 shows a connection diagram for a first example system.

FIG. 2 shows a connection diagram for a first example system. The system 200 includes three processor circuits 210, 212, and 214. The system includes a set of communication channels 230, 232, 234, 236, 238 and 240, for example, as provided by inter-processor communication circuit 110 in FIG. 1. Each communication channel provides a data path from a first processor to a second processor via a respective first buffer. Each communication channel also provides a data path from the second processor to the first processor via a respective second buffer. In some implementations, the data paths may include respective signal lines for communicating data between the processors and the buffer. In some other implementations, the data may be communicated between processors and the buffers via a shared data bus as shown in FIG. 1.

In this example, each processor circuit is connected to each other processor circuit by a respective one of the communication channels. Each processor circuit 210, 212, and 214 is also connected to itself by a respective communication channel 230, 238, and 240. The communication channels 230, 238, and 240 provide a mechanism for communication between different processes (e.g., process threads) executing on the same processor circuit.

In this example, each of the communication channels 230, 232, 234, 236, 238, and 240 is configured for bidirectional communication via a respective pair of buffers. Diagram 220 illustrates dataflow through the pair of buffers 222 and 224 for communication channel 234 connecting processor circuit A 210 and processor circuit B 212. Request and response messages (Rq_A and Rsp_A) are communicated from processor circuit A 210 to processor circuit B 212 via a first buffer 222 of the communication channel 234. Conversely, request and response messages (Rq_B and Rsp_B) are communicated from processor circuit B 212 to processor circuit A 210 via a second buffer 224 of the communication channel 234.

In this example, the system 200 includes three processor circuits. However, the system 200 may be adapted to include additional processors. Generally, for a system including N processors, the system will include $(N^2+N)/2$ bidirectional communication channels, which include $N^2+N$ buffers.

Figure 3:
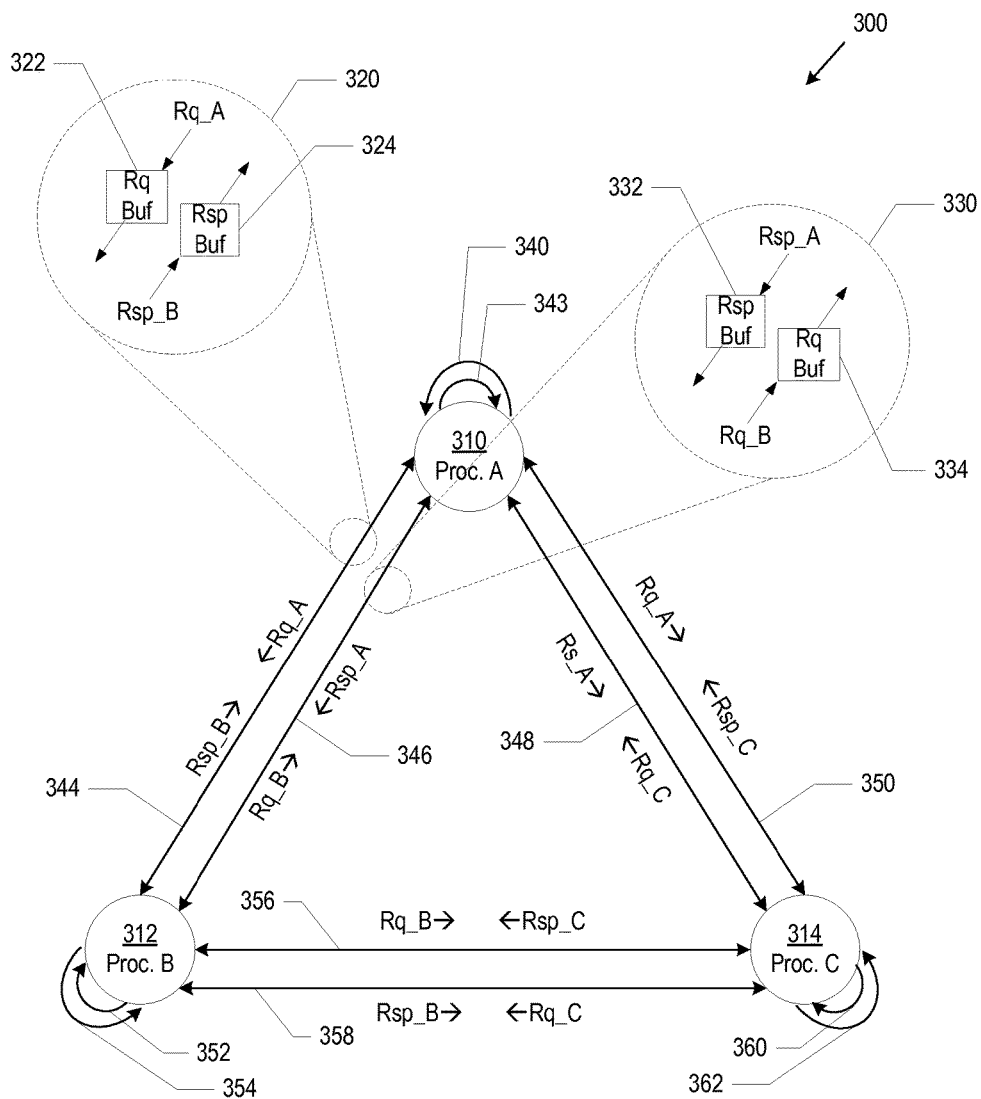
FIG. 3 shows a connection diagram for a second example system.

FIG. 3 shows a connection diagram for a second example system. The system 300 includes three processor circuits 310, 312, and 314 as described with reference to processor circuits 210, 212, and 214 in FIG. 2. In this example, the processor circuits 310, 312, and 314 are interconnected by a set of communication channels 340, 342, 344, 346, 348, 350, 352, 354, 356, 358, 360, and 362.

Each processor circuit (e.g., 310) is connected to each other processor circuit (e.g., 312 and 314) by a respective pair of communication channels (e.g., 344 and 346). Each processor circuit 310, 312, and 314 is also connected to itself by a respective pair of the communication channels (e.g., 340 and 342).

In this example, each of the pairs of communication channels between a respective pair of processors includes a first communication channel for data transactions initiated by a first one of the processors and includes a second communication channel for data transactions initiated by a second one of the processors. As one example, a first communication channel 344 communicates request messages (Rq_A) from processor circuit A 310 to processor circuit B 312 and communicates corresponding response messages (Rsp_B) from processor circuit B 312 to processor circuit A 310. A second communication channel 346 communicates request messages (Rq_B) from processor circuit B 312 to processor circuit A 310 and communicates corresponding response messages (Rsp_A) from processor circuit A 310 to processor circuit B 312.

In this example, each of the communications channels 340, 342, 344, 346, 348, 350, 352, 354, 356, 358, 360, and 362 includes a first buffer for communication of request messages in a first direction and a second buffer for communication of response messages in a second direction. Diagram 320 illustrates dataflow through a pair of buffers 322 and 324 for a first communication channel 344 connecting processor circuit A 310 and processor circuit B 312. Request messages Rq_A are communicated from processor circuit A 310 to processor circuit B 312 via buffer 322. Response messages Rsp_B are communicated from processor circuit B 312 to processor circuit A 310 via buffer 324. Diagram 330 illustrates dataflow through a pair of buffers 332 and 334 for a second communication channel 346 connecting processor circuit A 310 and processor circuit B 312. Request messages Rq_B are communicated from processor circuit B 312 to processor circuit A 310 via buffer 334. Response messages Rsp_A are communicated from processor circuit A 310 to processor circuit B 312 via buffer 332.

In this example, the system 300 includes three processor circuits. However, the system 300 may be adapted to include additional processors. Generally, for a system including N processors, the system 300 will include ($N^2$+N) bidirectional communication channels, which include ($2N^2$+2N) buffers. The system in FIG. 3 requires 2N additional buffers in comparison to the system shown in FIG. 2. However, the communicating request messages and response messages in each direction using separate buffers, as shown in FIG. 3 enables more sophisticated parallelism/streaming/pipelining of communications. As one example, a first processor circuit may be able to prepare and write a message to the buffer prior to receiving a response message for a previous message.

Figure 4:
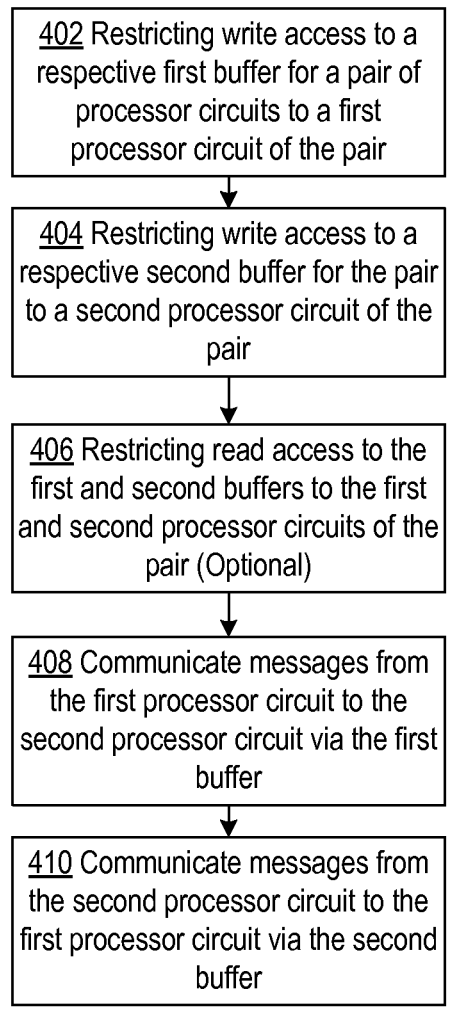
FIG. 4 shows a process for communicating messages between a pair of processor circuits.

FIG. 4 shows a process for communicating messages between a pair of processor circuits. At block 402, write access to a respective first buffer for the pair is restricted to a first processor circuit of the pair of processor circuits. At block 404, write access to a respective second buffer for the pair is restricted to a second processor circuit of the pair of processor circuits. Optionally, at block 406 read access to the first and second buffers is restricted to the pair of processor circuits. Restricting read access may also help prevent malicious processes from snooping on data communicated between the processors circuits. The restricting of read and/or write accesses at blocks 402, 404, and 406 may be performed, by an access control circuit that access control circuit, such as access control circuit 120 in FIG. 1, which connects the processors to the buffers. Additionally or alternatively, restricting of read and/or write accesses at blocks 402, 404, and 406 may be performed by configuring routing resources route data signals between each buffer and the processor(s) to which access is to be restricted.

At block 408, messages are communicated from the first processor circuit to the second processor circuit via the first buffer. The restricting of access to the first buffer at block 402 allows the first processor circuit to communicate data to the second processor circuit by writing to the first buffer without having to worry about the data being overwritten by another processor before it is read by the second processor. At block 410, messages are communicated from the second processor circuit to the first processor circuit via the second buffer. The restricting of access to the first buffer at block 404 allows the second processor circuit to communicate data to the first processor circuit by writing to the second buffer without having to worry about the being overwritten by another processor before it is read by the first processor.

Figure 5:
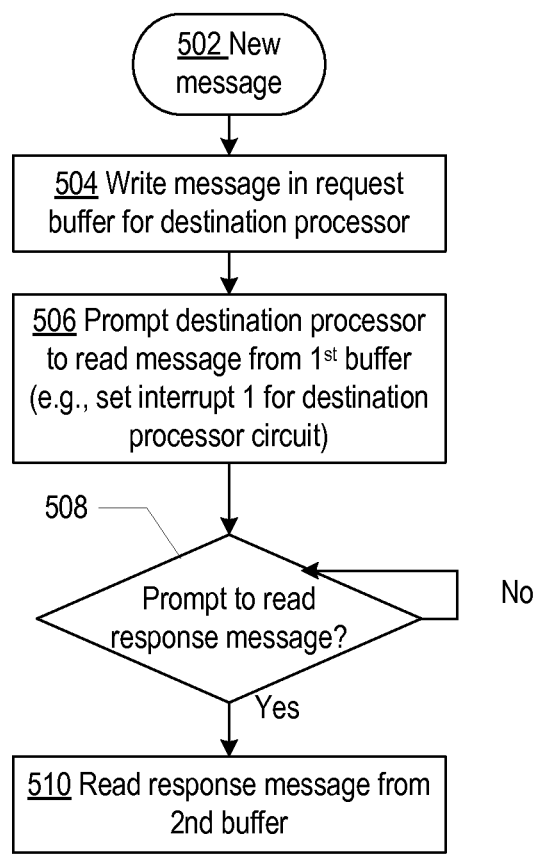
FIG. 5 shows an example process performed by a source processor circuit in a data transaction for communicating data to a destination processor circuit.
Figure 6:
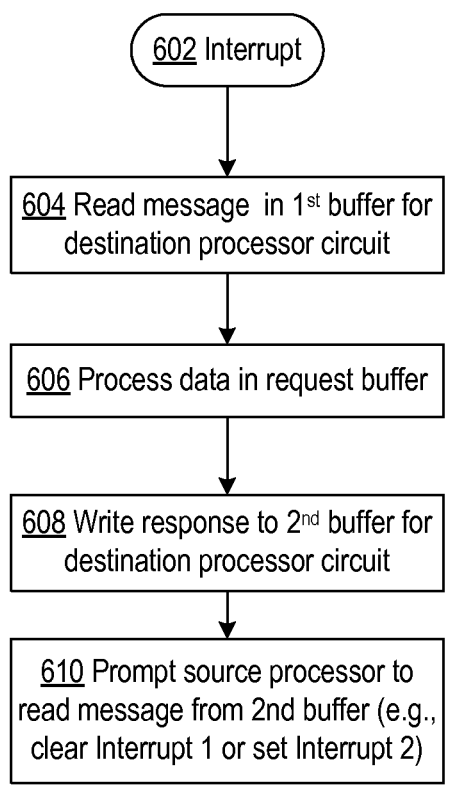
FIG. 6 shows an example process performed by a destination processor circuit in response to a source processor circuit initiating a data transaction.

FIG. 5 shows an example process performed by a source processor circuit in a data transaction for communicating data to a destination processor circuit. FIG. 6 shows an example process performed by a destination processor circuit in response to a source processor circuit initiating a data transaction. For ease of explanation, FIGS. 5 and 6 are discussed together in the context of processes performed to communicate data from processor circuits 210 to processor circuit 212 in FIG. 2. The process is initiated in FIG. 5 in response to a new message 502 to be communicated. At block 504, the message is written by the source processor circuit 210 to a first buffer 222 for the source and destination processor circuits. At block 506, the destination processor circuit 212 is prompted to read the message from the first buffer 222. For example, the source processor circuit 210 may prompt the destination processor circuit 212 by setting a first interrupt corresponding to the destination processor circuit 212. As discussed with reference to FIG. 6, the setting of the interrupt prompts the destination processor 212 to read the message from the first buffer 222. The process in FIG. 6 is initiated in response to the setting of the interrupt 602. At block 604, the message is read from the first buffer 222 by the destination processor circuit 212. At block 606, the message is processed by the destination processor circuit 212. At block 608, the destination processor circuit 212 writes a response message to a second buffer 224 for the source and destination processors. The response message may include, for example, an acknowledgement or data requested by the source processor. At block 610, the source processor circuit 210 is prompted to read the response message from the second buffer 224. The source processor circuit 210 may be prompted, for example, by clearing the first interrupt or by setting a second interrupt corresponding to the source processor circuit 210. Turning back to FIG. 5, the prompting at block 610 causes decision block 508 to advance the process to block 510. At block 510, the source processor circuit 210 reads the response message from the second buffer 224.

Figure 7:
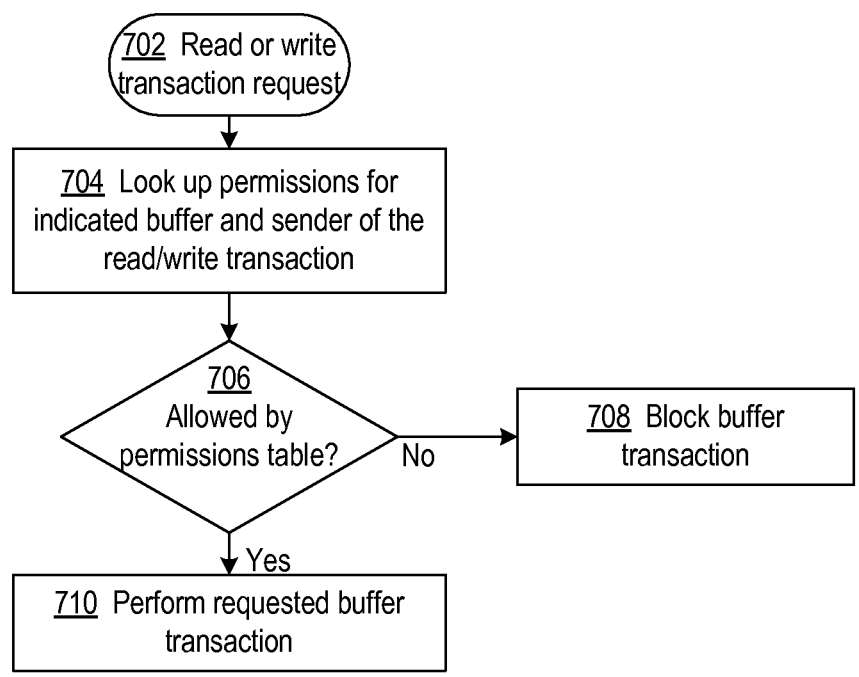
FIG. 7 shows a process performed by an inter-processor communication circuit.

FIG. 7 shows a process performed by an inter-processor communication circuit, consistent with one or more implementations. The process is initiated by the inter-processor communication circuit receiving a read or write transaction request for one of the buffers at block 702. In response to receiving a read/write transaction, the access control circuit looks up permissions for the indicated buffer and the sender of the read/write transaction at block 704. The permissions may be retrieved, for example, from a permissions table. If the transaction is allowed by the permissions, decision block 706 directs the process to block 710, where the requested buffer read/write transaction is performed. Otherwise, if the transaction is not allowed, decision block 706 directs the process to block 708, where the buffer read/write transaction is blocked.

Figure 8:
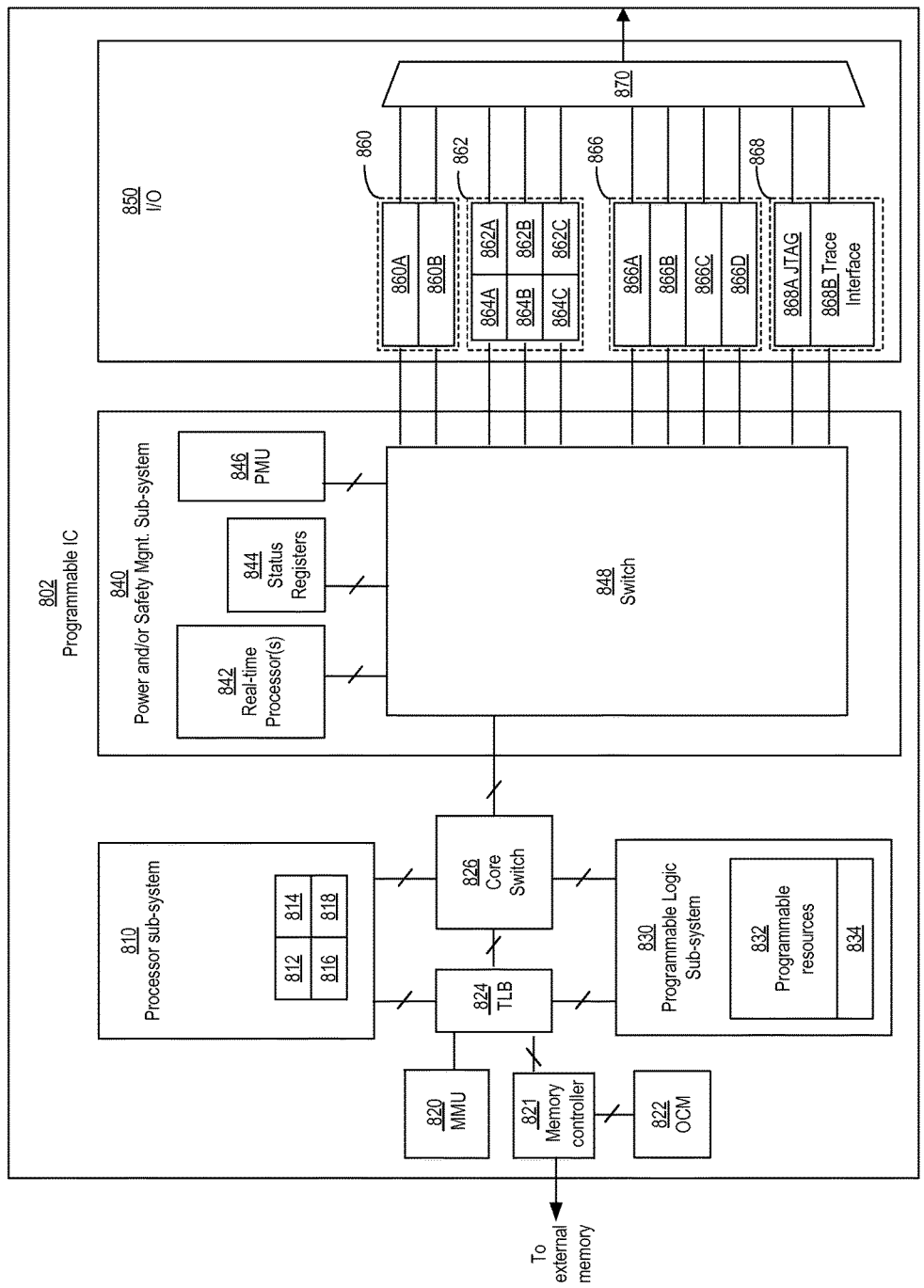
FIG. 8 shows a programmable IC that may be configured in accordance with the disclosed circuits and methods.

FIG. 8 shows a programmable IC 802 that may be configured in accordance with one or more implementations. The programmable IC may also be referred to as a System On Chip (SOC), which includes a processing sub-system 810 and a programmable logic sub-system 830. The processing sub-system 810 may be programmed to implement a software portion of the user design, via execution of a user program. The program may be specified as part of a configuration data stream or may be retrieved from an on-chip or off-chip data storage device. The processing sub-system 810 may include various circuits 812, 814, 816, and 818 for executing one or more software programs. The circuits 812, 814, 816, and 818 may include, for example, one or more processor cores, floating point units (FPUs), an interrupt processing unit, on chip-memory, memory caches, and/or cache coherent interconnect.

The programmable logic sub-system 830 of the programmable IC 802 may be programmed to implement a hardware portion of a user design. For instance, the programmable logic sub-system may include a number of programmable resources 832, which may be programmed to implement a set of circuits specified in a configuration data stream. The programmable resources 832 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 832 may be programmed by loading a configuration data stream into the configuration memory cells, which define how the programmable interconnect circuits and programmable logic circuits are configured. The collective states of the individual memory cells then determine the function of the programmable resources 832. The configuration data can be read from memory (e.g., from an external PROM) or written into the programmable IC 802 by an external device. In some implementations, configuration data may be loaded into configuration memory cells by a configuration controller 834 included in the programmable logic sub-system 830. In some other implementations, the configuration data may be loaded into the configuration memory cells by a start-up process executed by the processor sub-system 810.

The programmable IC 802 may include various circuits to interconnect the processing sub-system 810 with circuitry implemented within the programmable logic sub-system 830. In this example, the programmable IC 802 includes a core switch 826 that can route data signals between various data ports of the processing sub-system 810 and the programmable logic sub-system 830. The core switch 826 may also route data signals between either of the programmable logic or processing sub-systems 810 and 830 and various other circuits of the programmable IC, such as an internal data bus. Alternatively or additionally, the processing sub-system 810 may include an interface to directly connect with the programmable logic sub-system—bypassing the core switch 826. Such an interface may be implemented, for example, using the AMBA AXI Protocol Specification (AXI) as published by ARM.

In some implementations, the processing sub-system 810 and the programmable logic sub-system 830 may also read or write to memory locations of an on-chip memory 822 or off-chip memory (not shown) via memory controller 821. The memory controller 821 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 821 is able to communicate is provided for purposes of illustration only and is not intended as a limitation or to be exhaustive. As shown in FIG. 8, the programmable IC 802 may include a memory management unit 820 and translation look-aside buffer 824 to translate virtual memory addresses used by the sub-systems 810 and 830 to physical memory addresses used by the memory controller 821 to access specific memory locations.

The programmable IC may include an input/output (I/O) sub-system 850 for communication of data with external circuits. The I/O sub-system 850 may include various types of I/O devices or interfaces including for example, flash memory type I/O devices, higher performance I/O devices, lower performance interfaces, debugging I/O devices, and/or RAM I/O devices.

The I/O sub-system 850 may include one or more flash memory interfaces 860 illustrated as 860A and 860B. For example, one or more of flash memory interfaces 860 can be implemented as a Quad-Serial Peripheral Interface (QSPI) configured for 4-bit communication. One or more of flash memory interfaces 860 can be implemented as a parallel 8-bit NOR/SRAM type of interface. One or more of flash memory interfaces 860 can be implemented as a NAND interface configured for 8-bit and/or 16-bit communication. It should be appreciated that the particular interfaces described are provided for purposes of illustration and not limitation. Other interfaces having different bit widths can be used.

The I/O sub-system 850 can include one or more interfaces 862 providing a higher level of performance than flash memory interfaces 860. Each of interfaces 862A-862C can be coupled to a DMA controller 864A-864C respectively. For example, one or more of interfaces 862 can be implemented as a Universal Serial Bus (USB) type of interface. One or more of interfaces 862 can be implemented as a gigabit Ethernet type of interface. One or more of interfaces 862 can be implemented as a Secure Digital (SD) type of interface.

The I/O sub-system 850 may also include one or more interfaces 866 such as interfaces 866A-866D that provide a lower level of performance than interfaces 862. For example, one or more of interfaces 866 can be implemented as a General Purpose I/O (GPIO) type of interface. One or more of interfaces 866 can be implemented as a Universal Asynchronous Receiver/Transmitter (UART) type of interface. One or more of interfaces 866 can be implemented in the form of a Serial Peripheral Interface (SPI) bus type of interface. One or more of interfaces 866 can be implemented in the form of a Controller-Area-Network (CAN) type of interface and/or an $I^2C$ type of interface. One or more of interfaces 866 also can be implemented in the form of a timer type of interface.

The I/O sub-system 850 can include one or more debug interfaces 868 such as processor JTAG (PJTAG) interface 868A and a trace interface 868B. PJTAG interface 868A can provide an external debug interface for the programmable IC 802. Trace interface 868B can provide a port to receive debug, e.g., trace, information from the processing sub-system 810 or the programmable logic sub-system 830.

As shown, each of interfaces 860, 862, 866, and 868 can be coupled to a multiplexer 870. Multiplexer 870 provides a plurality of outputs that can be directly routed or coupled to external pins of the programmable IC 802, e.g., balls of the package within which the programmable IC 802 is disposed. For example, I/O pins of programmable IC 802 can be shared among interfaces 860, 862, 866, and 868. A user can configure multiplexer 870, via a configuration data stream to select which of interfaces 860-868 are to be used and, therefore, coupled to I/O pins of programmable IC 802 via multiplexer 870. The I/O sub-system 850, may also include a fabric multiplexer I/O (FMIO) interface (not shown) to connect interfaces 862-868 to programmable logic circuits of the programmable logic sub-system. Additionally or alternatively, the programmable logic sub-system 830 can be configured to implement one or more I/O circuits within programmable logic. In some implementations, the programmable IC 802 may also include a sub-system 840 having various circuits for power and/or safety management. For example, the sub-system 840 may include a power management unit 846 configured to monitor and maintain one or more voltage domains used to power the various sub-systems of the programmable IC 802. In some implementations, the power management unit 846 may disable power of individual sub-systems, when idle, to reduce power consumption, without disabling power to sub-systems in use.

The sub-system 840 may also include safety circuits to monitor the status of the sub-systems to ensure correct operation. For instance, the sub-system 840 may include one or more real-time processors 842 configured to monitor the status of the various sub-systems (e.g., as indicated in status registers 844). The real-time processors 842 may be configured to perform a number of tasks in response to detecting errors. For example, for some errors, the real-time processors 842 may generate an alert in response to detecting an error. As another example, the real-time processors 842 may reset a sub-system to attempt to restore the sub-system to correct operation. The sub-system 840 includes a switch network 848 that may be used to interconnect various sub-systems. For example, the switch network 848 may be configured to connect the various sub-systems 810, 830, and 840 to various interfaces of the I/O sub-system 850. In some applications, the switch network 848 may also be used to isolate the real-time processors 842 from the sub-systems that are to be monitored. Such isolation may be required by certain application standards (e.g., IEC-61508 SIL3 or ISO-26262 standards) to ensure that the real-time processors 842 are not affected by errors that occur in other sub-systems.

The methods and circuits are thought to be applicable to a variety of systems and applications. Other aspects and features will be apparent to those skilled in the art from consideration of the specification. For example, though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:

1. A system, comprising:
    a plurality of N processor circuits; and
    an inter-processor communication circuit coupled to the plurality of processor circuits and configured to provide, for each pair of the processor circuits, a respective, dedicated communication channel between a first processor circuit of the pair to a second processor circuit of the pair, wherein the inter-processor communication circuit includes:
        a plurality of buffers including $N^2+N$ buffers, wherein for each respective communication channel the plurality of buffers includes a respective first buffer and a respective second buffer;
        wherein:
            the respective first buffer is dedicated to write access by the first processor circuit and read access by the second processor circuit,
            the respective second buffer is dedicated to write access by the second processor circuit and read access by the first processor circuit, and
            the respective communication channel between the first and second processor circuits is bidirectional; and
        an access control circuit coupled to the plurality of buffers and configured to, for the respective communication channel between the first processor circuit to the second processor circuit:
            restrict write access to the first buffer to the first processor circuit; and
            restrict write access to the second buffer to the second processor circuit.

2. A system, comprising:
    N processor circuits; and
    an inter-processor communication circuit coupled to the plurality of processor circuits and configured to provide, for each pair of the processor circuits, a respective, dedicated communication channel between a first processor circuit of the pair to a second processor circuit of the pair, wherein the inter-processor communication circuit includes:
        $(2N^2+2N)$ buffers including for each respective communication channel, a respective first buffer and a respective second buffer, wherein the respective first buffer is dedicated to write access by the first processor circuit and read access by the second processor circuit, and the second buffer is dedicated to write access by the second processor circuit and read access by the first processor circuit; and
        an access control circuit coupled to the plurality of buffers and configured to, for the respective communication channel between the first processor circuit to the second processor circuit:
            restrict write access to the first buffer to the first processor circuit, and
            restrict write access to the second buffer to the second processor circuit;
    wherein:
        for each of the pairs of the processor circuits, the respective communication channel between the first and second processor circuits is a communication channel from the first processor circuit to the second processor circuit;
        the inter-processor communication circuit is further configured to provide a second communication channel from the second processor circuit to the first processor circuit.

3. The system of claim 1, wherein for each of the pairs of the processor circuits, the first processor circuit is configured to, in response to writing a message to the first buffer, prompt the second processor to read the message from the first buffer.

4. The system of claim 3, wherein the prompting by the first processor circuit includes providing setting a first interrupt.

5. The system of claim 4, wherein for each of the pairs of processor circuits, the second processor circuit is configured to read the message from the respective first buffer in response to the first interrupt.

6. The system of claim 5, wherein the second processor circuit is further configured to, in response to the message read from the respective first buffer:
    write a response message to the respective second buffer; and
    prompt the respective first processor circuit to read the response message from the second buffer.

7. The system of claim 6, wherein the prompting of the respective first processor circuit by the respective second processor circuit includes clearing the first interrupt.

8. The system of claim 6, wherein the prompting of the respective first processor circuit by the respective second processor circuit setting a second interrupt.

9. The system of claim 1, wherein:
    the plurality of buffers are located at respective memory addresses of a memory; and
    the access control circuit is configured to process access requests to read or write from the memory.

10. The system of claim 9, wherein the access control circuit is configured to, in response to one of the access requests, determine whether or not access should be allowed based on a source address indicated in the access request, a destination address indicated in the access request, and a permissions table indicating access permissions for each of the plurality of buffers.

11. The system of claim 2, wherein for each of the pairs of the processor circuits, the respective first processor circuit is configured to, in response to writing a message to the first buffer, prompt the respective second processor to read the message from the first buffer.

12. The system of claim 11, wherein the prompting by the first processor circuit includes providing setting a first interrupt.

13. The system of claim 12, wherein for each of the pairs of the processor circuits, the second processor circuit is configured to read the message from the respective first buffer in response to the first interrupt.

14. The system of claim 2, wherein:
the plurality of buffers are located at respective memory addresses of a memory; and
the access control circuit is configured to process access requests to read or write from the memory.

15. The system of claim 14, wherein the access control circuit is configured to, in response to one of the access requests, determine whether access should be allowed based on a source address indicated in the access request, a destination address indicated in the access request, and a permissions table indicating access permissions for each of the plurality of buffers.

16. A method for communication between a plurality of N processor circuits, comprising:
providing, for each pair of the processor circuits, a respective, dedicated first communication channel from a first processor circuit of the pair to a second processor circuit of the pair;
providing, for each pair of the processor circuits, a respective, dedicated second communication channel from the second processor circuit of the pair to the first processor circuit of the pair;
providing a plurality of $(2N^2+2N)$ buffers, including for each respective communication channel, a respective first buffer and a respective second buffer;
restricting write access to the respective first buffer to the first processor circuit of a pair of the N processor circuits;
restricting write access to the respective second buffer to the second processor circuit of a pair of the N processor circuits;
communicating request messages from the first processor circuit of a pair of the N processor circuits to the second processor circuit of the pair via the respective first buffer of the respective first communication channel; and
communicating response messages from the second processor circuit of a pair of N processor circuits to the first processor circuit of the pair via the respective second buffer of the respective first communication channel;
communicating request messages from the second processor circuit of a pair of the N processor circuits to the first processor circuit of the pair via the respective first buffer of the respective second communication channel; and
communicating response messages from the first processor circuit of a pair of the N processor circuits to the second processor circuit of the pair via the respective second buffer of the respective second communication channel.

17. The method of claim 16, further comprising:
restricting read access to the respective first and second buffers to the first and second processor circuits of a pair of the N processor circuits; and
wherein the communicating of the request messages from the first processor circuit to the second processor circuit includes:
using the first processor circuit of the pair,
writing a first message to the respective first buffer, and
prompting the second processor circuit of the pair to read the first message from the respective first buffer; and
using the second processor circuit of the pair, retrieving the first message from the respective first buffer in response to the prompting by the first processor circuit.

18. The method of claim 17, wherein the communicating of the response messages from the second processor circuit to the first processor circuit includes:
using the second processor circuit of the pair,
writing a second message to the respective second buffer in response to reading the first message from the respective first buffer, and
prompting the first processor circuit of the pair to read the second message from the respective second buffer; and
using the first processor circuit of the pair, reading the second message from the respective first buffer in response to the prompting by the second processor circuit of the pair.

19. The method of claim 18, wherein:
the prompting of the second processor circuit includes setting a first interrupt; and
the prompting of the first processor circuit includes setting a second interrupt.

20. The method of claim 18, wherein:
the prompting of the second processor circuit includes setting a first interrupt; and
the prompting of the first processor circuit includes clearing the first interrupt.

* * * * *